United States Patent
Yates

(10) Patent No.: US 11,191,261 B1
(45) Date of Patent: Dec. 7, 2021

(54) BIRD-NESTING PREVENTION DEVICE

(71) Applicant: Charles Yates, Jonesville, SC (US)

(72) Inventor: Charles Yates, Jonesville, SC (US)

( * ) Notice: Subject to any disclaimer, the term of this patent is extended or adjusted under 35 U.S.C. 154(b) by 131 days.

(21) Appl. No.: 16/708,569

(22) Filed: Dec. 10, 2019

(51) Int. Cl.
*A01M 29/32* (2011.01)
*A01M 1/24* (2006.01)
*E04D 13/00* (2006.01)

(52) U.S. Cl.
CPC .............. *A01M 29/32* (2013.01); *A01M 1/24* (2013.01); *E04D 13/004* (2013.01)

(58) Field of Classification Search
CPC ....... A01M 29/32; A01M 1/24; E04D 13/004; E04B 1/72; E04B 1/92
See application file for complete search history.

(56) References Cited

U.S. PATENT DOCUMENTS

| | | | | |
|---|---|---|---|---|
| 168,446 A | * | 10/1875 | Blodget | A01M 29/32 52/101 |
| 2,129,833 A | * | 9/1938 | Fradette | E04D 1/365 52/24 |
| 2,131,844 A | * | 10/1938 | Mooshian | E04D 1/3405 52/95 |
| 2,258,803 A | * | 10/1941 | Peles | A01M 29/32 52/101 |
| 2,298,194 A | * | 10/1942 | Caldwell | A01M 29/32 52/101 |
| 3,194,527 A | * | 7/1965 | Gruss | F16B 12/46 248/235 |
| 3,359,657 A | * | 12/1967 | Hedberg | B29C 53/06 434/211 |
| 4,269,008 A | * | 5/1981 | Assouline | A01M 29/32 52/101 |
| 4,275,532 A | | 6/1981 | Watson | |
| 4,283,894 A | * | 8/1981 | Raty | E04B 9/005 52/311.1 |

(Continued)

FOREIGN PATENT DOCUMENTS

| | | | | | |
|---|---|---|---|---|---|
| DE | | 3431207 A | * | 3/1985 | ......... E04F 13/0733 |
| DE | | 19947356 A1 | * | 4/2001 | |

(Continued)

OTHER PUBLICATIONS

Machine Translation of JP 04309659 A (obtained by the European Patent Office on Jun. 10, 21) (Year: 1992).*

*Primary Examiner* — Brian D Mattei
*Assistant Examiner* — Charissa Ahmad
(74) *Attorney, Agent, or Firm* — Kyle A. Fletcher, Esq.

(57) ABSTRACT

The bird-nesting prevention device is a mechanical structure. The bird-nesting prevention device is configured for use with a porch roof. The porch roof further comprises with a column. The column further comprises with a capital. The capital comprises the elements of the column that attach to the porch roof. The bird-nesting prevention device forms a barrier that prevents one or more birds from nesting on the capital of the column. The bird-nesting prevention device comprises a master prism structure and a bird's mouth cut. The bird's mouth cut is a negative space formed in the master prism structure. The bird's mouth cut attaches the master prism structure to the capital using a bird's mouth joint. The master prism structure forms a barrier that prevents the one or more birds from nesting on the capital of the column.

19 Claims, 3 Drawing Sheets

(56) References Cited

U.S. PATENT DOCUMENTS

| | | | | |
|---|---|---|---|---|
| 4,837,991 A | * | 6/1989 | Shaw | E02D 31/02 52/169.5 |
| 4,839,984 A | * | 6/1989 | Saunders | A01M 1/223 43/112 |
| 4,937,988 A | * | 7/1990 | Gratton | A01K 39/01 256/11 |
| 5,092,088 A | * | 3/1992 | Way | E04B 1/92 52/101 |
| 5,253,444 A | * | 10/1993 | Donoho | A01M 29/32 43/1 |
| 5,303,523 A | * | 4/1994 | Hand | A01G 13/105 119/61.53 |
| 5,433,029 A | * | 7/1995 | Donoho | A01M 29/32 256/11 |
| 5,454,183 A | * | 10/1995 | Antonini | A01M 29/32 43/1 |
| 5,471,799 A | * | 12/1995 | Smeja | E04D 13/10 52/24 |
| 5,487,199 A | * | 1/1996 | Nelson | E01D 19/00 14/74.5 |
| 5,531,043 A | * | 7/1996 | Shiboh | A01M 1/14 43/121 |
| 5,769,598 A | * | 6/1998 | MacNeil | B65D 19/38 206/459.1 |
| 5,815,981 A | * | 10/1998 | Dowling | A01M 1/14 43/114 |
| 5,913,780 A | | 6/1999 | Goergen | |
| D451,204 S | | 11/2001 | Schlichting | |
| 6,314,688 B1 | * | 11/2001 | Ford | A62B 99/00 52/101 |
| D482,604 S | * | 11/2003 | Smeja | D8/499 |
| 7,712,263 B1 | * | 5/2010 | Lippie | E04B 1/72 52/101 |
| D631,729 S | * | 2/2011 | Bucci | D8/354 |
| 7,937,896 B1 | | 5/2011 | Lippie | |
| 8,151,535 B1 | * | 4/2012 | Thompson | E04B 1/2608 52/715 |
| 8,424,259 B2 | * | 4/2013 | Koren | E04C 3/36 52/301 |
| 8,640,397 B2 | | 2/2014 | Donoho | |
| 9,394,683 B1 | | 7/2016 | Hammons | |
| 9,631,368 B1 | * | 4/2017 | Heo | E04D 13/004 |
| D862,635 S | * | 10/2019 | Madden | F16B 5/02 D22/120 |
| D862,636 S | * | 10/2019 | Madden | E04C 3/36 D22/120 |
| 10,954,675 B1 | * | 3/2021 | Markway | E04D 13/10 |
| 2002/0157325 A1 | * | 10/2002 | Domanico | A47K 3/008 52/35 |
| 2003/0000157 A1 | * | 1/2003 | Austin | E04D 3/40 52/95 |
| 2004/0112003 A1 | * | 6/2004 | Savenok | E04C 3/36 52/218 |
| 2004/0194423 A1 | | 10/2004 | Payne | |
| 2005/0084323 A1 | * | 4/2005 | Hinsberger | F16B 5/02 403/187 |
| 2005/0210769 A1 | * | 9/2005 | Harvey | E04H 12/24 52/101 |
| 2019/0119911 A1 | * | 4/2019 | Madden | E04D 13/004 |

FOREIGN PATENT DOCUMENTS

| | | | |
|---|---|---|---|
| GB | 2285732 | 10/1997 | |
| JP | 04309659 A | * 11/1992 | E04F 13/0733 |
| JP | 06284848 A | * 10/1994 | A01M 29/32 |

\* cited by examiner

US 11,191,261 B1

BIRD-NESTING PREVENTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of buildings and roof coverings including special arrangements for roof coverings, more specifically, a device that provides protection against birds. (E04D13/004)

SUMMARY OF INVENTION

The bird-nesting prevention device is a mechanical structure. The bird-nesting prevention device is configured for use with a porch roof. The porch roof further comprises a column. The column is a vertically oriented load bearing structure that transfers the load of the porch roof to a supporting surface. The column further comprises with a capital. The capital are the elements of the column that attach to the porch roof. The bird-nesting prevention device forms a barrier that prevents one or more birds from nesting on the capital of the column. The bird-nesting prevention device comprises a master prism structure and a bird's mouth cut. The bird's mouth cut is a negative space formed in the master prism structure. The bird's mouth cut attaches the master prism structure to the capital using a bird's mouth joint. The master prism structure forms a barrier that prevents the one or more birds from nesting on the capital of the column.

These together with additional objects, features and advantages of the bird-nesting prevention device will be readily apparent to those of ordinary skill in the art upon reading the following detailed description of the presently preferred, but nonetheless illustrative, embodiments when taken in conjunction with the accompanying drawings.

In this respect, before explaining the current embodiments of the bird-nesting prevention device in detail, it is to be understood that the bird-nesting prevention device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bird-nesting prevention device.

It is therefore important that the claims be regarded as including such equivalent construction insofar as they do not depart from the spirit and scope of the bird-nesting prevention device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
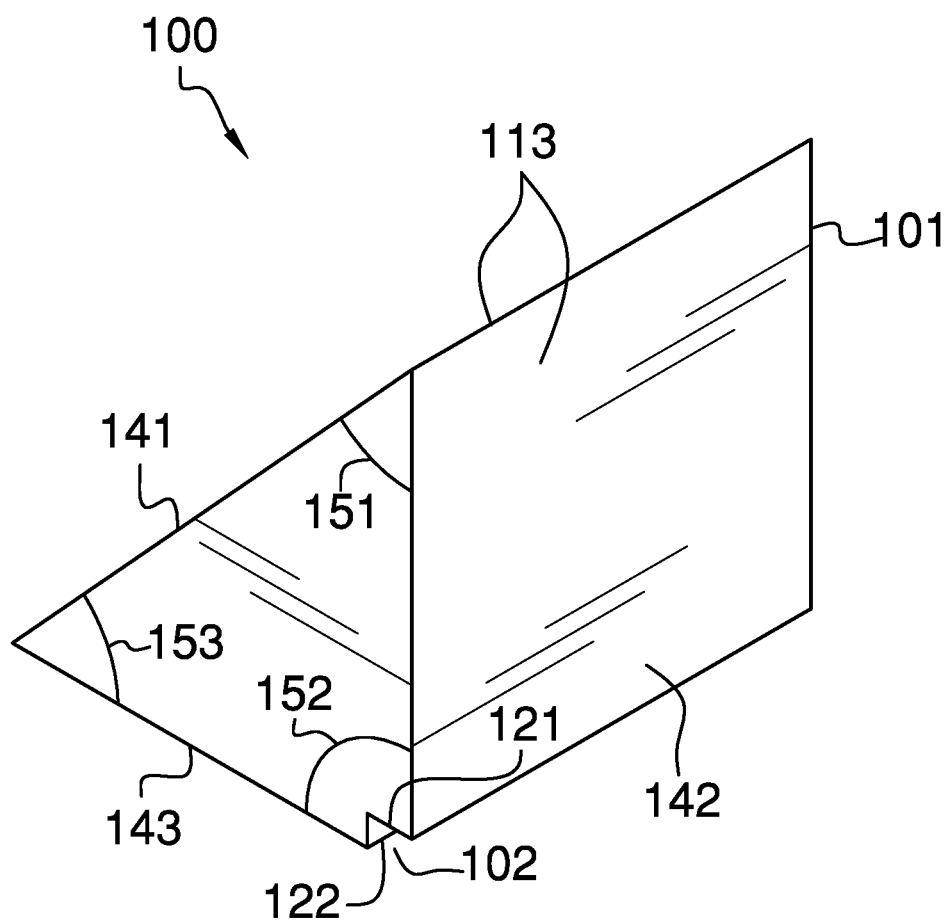
FIG. 1 is a perspective view of an embodiment of the disclosure.
Figure 2:
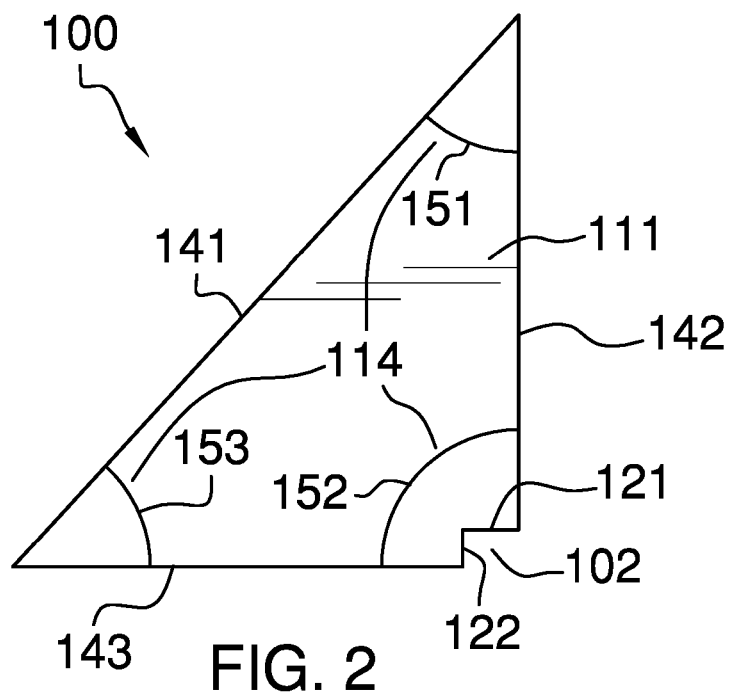
FIG. 2 is a side view of an embodiment of the disclosure.
Figure 3:
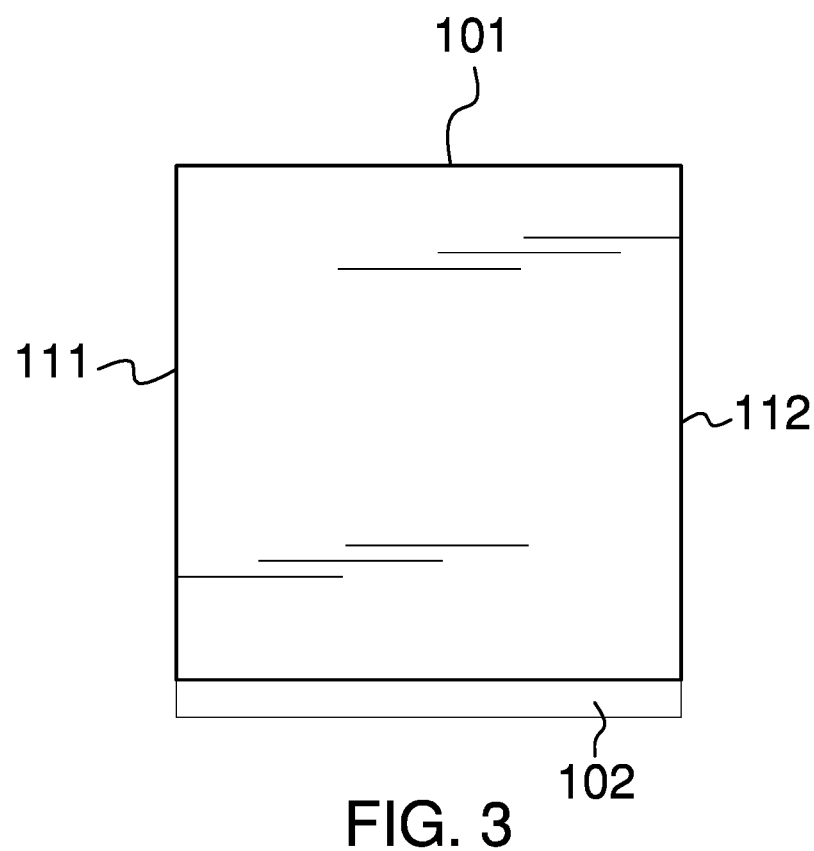
FIG. 3 is a front view of an embodiment of the disclosure.
Figure 4:
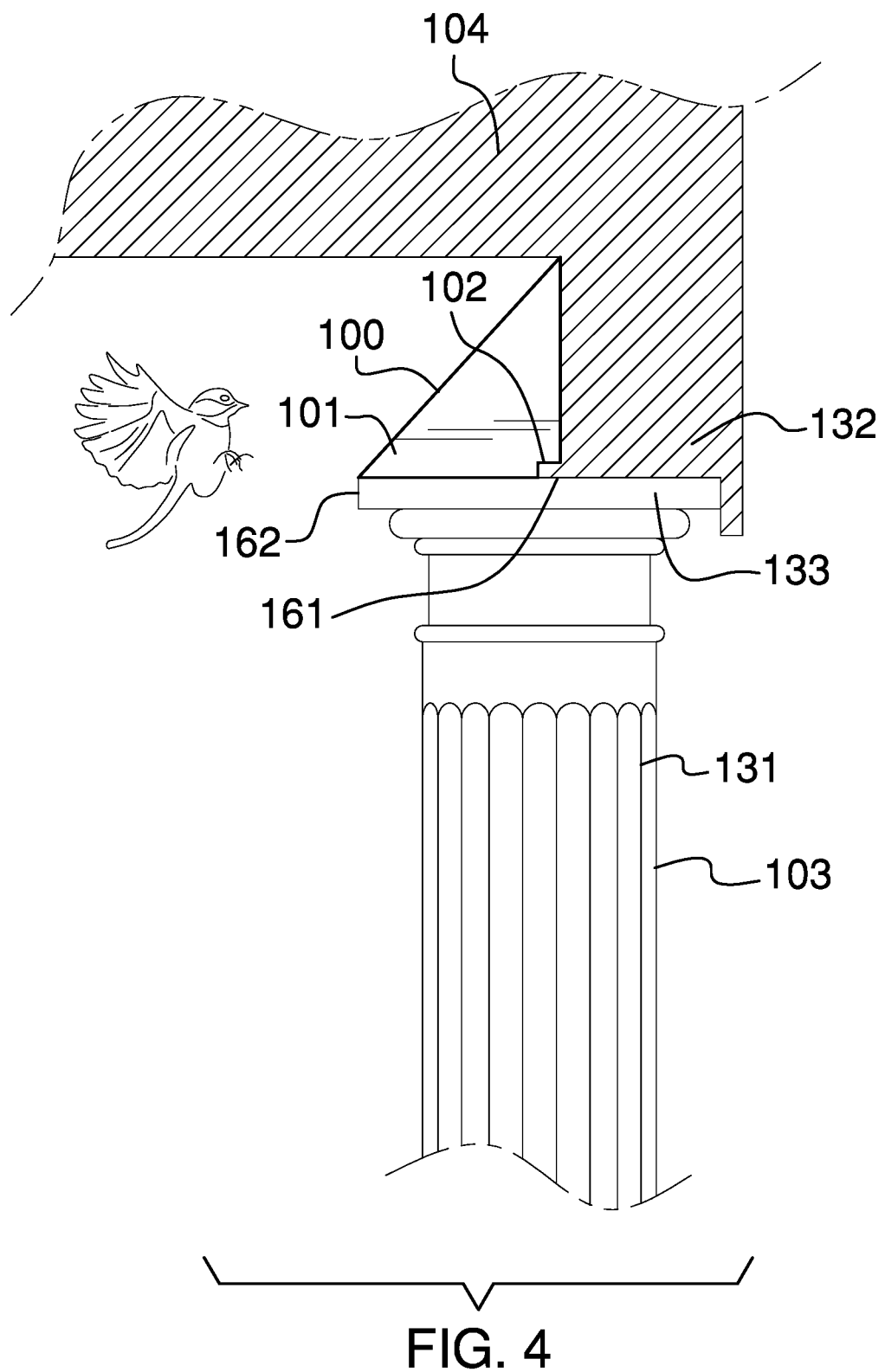
FIG. 4 is an in-use view of an embodiment of the disclosure.

Detailed reference will now be made to one or more potential embodiments of the disclosure, which are illustrated in FIGS. 1 through 4.

The bird-nesting prevention device 100 (hereinafter invention) is a mechanical structure. The invention 100 is configured for use with a porch roof 104. The porch roof 104 further comprises a column 103. The column 103 is a vertically oriented load-bearing structure that transfers the load of the porch roof 104 to a supporting surface. The column 103 further comprises a capital 132. The capital 132 comprises the elements of the column 103 that attach to the porch roof 104. The invention 100 forms a barrier that prevents one or more birds from nesting on the capital 132 of the column 103. The invention 100 comprises a master prism structure 101 and a bird's mouth cut 102. The bird's mouth cut 102 is a negative space formed in the master prism structure 101. The bird's mouth cut 102 attaches the master prism structure 101 to the capital 132 using a bird's mouth joint. The master prism structure 101 forms a barrier that prevents the one or more birds from nesting on the capital 132 of the column 103.

The porch roof 104 is a roof that covers an outdoor structure commonly referred to as a porch. The roof is defined elsewhere in this disclosure.

The column 103 is a supporting structure that elevates the porch roof 104 above a supporting surface. The column 103 is defined elsewhere in this disclosure. The column 103 comprises a stanchion 131 and a capital 132.

The stanchion 131 is the extension structure that elevates the capital 132 above a supporting surface. The superior congruent end 133 is a congruent end of the stanchion 131. The stanchion 131 further comprises a superior congruent end 133. The superior congruent end 133 forms the superior surface of the stanchion 131.

The capital 132 is a structure that attaches the porch roof 104 to the superior congruent end 133 of the stanchion 131. The capital 132 forms a load path that transfers the load of the porch roof 104 to the stanchion 131 of the column 103. The capital 132 further comprises a superior capital 132 face 161 and a lateral capital 132 face 162. The superior capital 132 face 161 is a horizontally oriented surface that is formed on the superior congruent end 133 of the stanchion 131 by the capital 132. The lateral capital 132 face 162 is a vertically oriented surface that is formed on the superior congruent end 133 of the stanchion 131 by the capital 132. The superior capital 132 face 161 and the lateral capital 132 face 162 form a brink that is geometrically similar to the brink formed by the seating cut 121 and the heel cut 122 of the bird's mouth cut 102.

The stanchion 131 and the capital 132 are further defined elsewhere in this disclosure.

The master prism structure 101 is a prism-shaped structure. The master prism structure 101 forms the primary shape of the invention 100. The master prism structure 101 forms the barrier structure that prevents a bird from building a nest on the superior congruent end 133 of the column 103. In the first potential embodiment of the disclosure, the primary shape of the master prism structure 101 forms a triangular prism shape. The master prism structure 101 comprises a first congruent end 111, a second congruent end 112, a plurality of lateral faces 113, and a plurality of cants 114.

The first congruent end 111 is a congruent end of the master prism structure 101. The second congruent end 112 is the congruent end of the master prism structure 101 that is distal from the first congruent end 111. The first congruent end 111 and the second congruent end 112 form the triangular shape of the master prism structure 101.

The plurality of lateral faces 113 form the lateral faces of the master prism structure 101. The plurality of lateral faces 113 form the faces of the master prism structure 101 that run from the first congruent end 111 to the second congruent end 112. The plurality of lateral faces 113 form the barrier structure that prevents a bird from building a nest on the superior congruent end 133 of the column 103. The plurality of lateral faces 113 comprises a first lateral face 141, a second lateral face 142, and a third lateral face 143.

The first lateral face 141 is a solid lateral face of the master prism structure 101. The first lateral face 141 is bounded by the first congruent end 111, the second congruent end 112, the second lateral face 142, and the third lateral face 143. The first lateral face 141 forms a canted surface that is not vertically oriented. The first lateral face 141 forms a canted surface that is not horizontally oriented. The position of the canted surface of the first lateral face 141 is such that the first lateral face 141 forms a barrier that makes the superior congruent end 133 of the stanchion 131 unsuitable for a bird's nest.

The second lateral face 142 is a solid lateral face of the master prism structure 101. The second lateral face 142 is bounded by the first congruent end 111, the second congruent end 112, the third lateral face 143, and the first lateral face 141. The second lateral face 142 is a vertically oriented surface.

The third lateral face 143 is a solid lateral face of the master prism structure 101. The third lateral face 143 is bounded by the first congruent end 111, the second congruent end 112, the first lateral face 141, and the second lateral face 142. The third lateral face 143 is a horizontally oriented surface.

The plurality of cants 114 refers to an angle that is formed between any initial lateral face selected from the plurality of lateral faces 113 and any subsequent lateral face selected from the plurality of lateral faces 113. The angle formed by each cant selected from the plurality of cants 114 ensures that no horizontal surfaces are presented to a bird at the superior congruent end 133 of the column 103. The plurality of cants 114 further comprises a first cant 151, a second cant 152, and a third cant 153.

The first cant 151 is the cant that is formed at the formed by the first lateral face 141 and the second lateral face 142. The second cant 152 is the cant that is formed at the formed by the second lateral face 142 and the third lateral face 143. The third cant 153 is the cant that is formed at the formed by the third lateral face 143 and the first lateral face 141.

In the first potential embodiment of the disclosure, the first cant 151 is an acute angle. The second cant 152 is a right (90 degree) angle. The third cant 153 is an acute angle. The first cant 151 and the third cant 153 are selected such that a bird will be discouraged from nesting on the capital 132.

The bird's mouth cut 102 is a negative space that is formed in the master prism structure 111. The bird's mouth cut 102 has a rectangular block structure. The bird's mouth cut 102 is formed at the brink that is formed at the intersection of the second lateral face 142 and the third lateral face 143 of the master prism structure 101. The bird's mouth cut 102 is geometrically similar to the brink formed at the intersection of the superior capital 132 face 161 and the lateral capital 132 face 162 of the capital 132 of the column 103. The bird's mouth cut 102 is formed such that the bird's mouth cut 102 sits flush against both the superior capital 132 face 161 and the lateral capital 132 face 162 to form a bird's mouth joint that attaches the master prism structure 101 to the capital 132 of the column 103. The bird's mouth cut 102 and the bird's mouth joint are defined elsewhere in this disclosure.

The bird's mouth cut 102 further comprises a seating cut 121 and a heel cut 122.

The seating cut 121 is a solid surface within the master prism structure 101 that is formed by the negative space that creates the bird's mouth cut 102. The surface formed by the seating cut 121 is parallel to the third lateral face 143 of the master prism structure 101. The surface formed by the seating cut 121 is perpendicular to the second lateral face 142 of the master prism structure 101. The seating cut 121 sits flush against the superior capital 132 face 161 of the capital 132 to form the bird's mouth joint that attaches the master prism structure 101 to the capital 132.

The heel cut 122 is a solid surface within the master prism structure 101 that is formed by the negative space that creates the bird's mouth cut 102. The surface formed by the heel cut 122 is parallel to the second lateral face 142 of the master prism structure 101. The surface formed by the heel cut 122 is perpendicular to the third lateral face 143 of the master prism structure 101. The heel cut 122 sits flush against the lateral capital 132 face 162 of the capital 132 to form the bird's mouth joint that attaches the master prism structure 101 to the capital 132.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Angle: As used in this disclosure, an angle is a measure of a region between two intersecting lines or surfaces.

Barrier: As used in this disclosure, a barrier is a physical obstacle that forms a boundary between a first space and a second space. The barrier prevents the passage of an object between the first space and the second space.

Bird's Mouth Cut: As used in this disclosure, a bird's mouth cut is a negative space that is formed in a first object. The bird's mouth cut is geometrically similar to a brink that is formed in a second object such that the first object will fit flush against the second object at the bird's mouth cut. The surface of the negative space that forms the face of the bird's mouth cut that is roughly horizontally oriented is called the seat cut. The surface of the negative space that forms the face of the bird's mouth cut that is roughly vertically oriented is called the heel cut. A bird's mouth joint refers to the joint that is formed when the first object attaches to the second object at the bird's mouth cut.

Brink: As used in this disclosure, a brink refers to the edge or line formed by the intersection of a first plane or surface and a second plane or surface wherein a cant exists between the first plane or surface and the second plane or surface.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Column: As used in this disclosure, a column is a vertically oriented load bearing structure. The column elevates an object above a supporting surface. The column comprises a base, a stanchion, and a capital. The stanchion is prism-shaped structure that forms an extension structure that extends the reach between the supporting surface and the object. The base is a pedestal structure that forms the final link of the load path between the object and the supporting surface. The base attaches to the inferior congruent end of the prism structure of the stanchion. The base is often referred to as a plinth. The capital is a mechanical structure that attaches the object to the superior congruent end of the prism structure of the stanchion.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Flush: As used in this disclosure, the term flush is used to describe the alignment of a first surface and a second surface to form a single structure selected from the group consisting of a Euclidean plane and a non-Euclidean plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pedestal: As used in this disclosure, a pedestal is an intermediary load bearing structure that that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectangular Block: As used in this disclosure, a rectangular block refers to a three-dimensional prism structure comprising six rectangular surfaces (commonly called faces) formed at right angles. Within this disclosure, a rectangular block may further comprise rounded edges and corners.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Roof: As used in this disclosure, a roof is the exterior surface of a structure that is distal from the surface upon which the structure is placed. As used in this disclosure, the exterior surface is assumed to include the supporting structures associated with the exterior surface including, but not limited to, rafters, decking, soffits, and fascia. A pitched roof is a roof wherein the surface of the roof has a cant that is not perpendicular to the direction of gravity.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bird-nesting prevention device comprising
a master prism structure and a bird's mouth cut;
wherein the bird's mouth cut is a negative space formed in the master prism structure;
wherein the bird-nesting prevention device is configured for use with a porch roof;
wherein the porch roof further comprises a column;
wherein the column is a vertically oriented load-bearing structure that receives the load of the porch roof;
wherein the column further comprises a capital;
wherein the capital comprises the elements of the column that attach to the porch roof;
wherein the bird-nesting prevention device forms a barrier that prevents one or more birds from nesting on the capital of the column;
wherein the master prism structure comprises a first congruent end, a second congruent end, a plurality of lateral faces, and a plurality of cants;
wherein the plurality of lateral faces comprises a first lateral face, a second lateral face, and a third lateral face;
wherein the bird's mouth cut has a rectangular block structure;
wherein the bird's mouth cut is formed at a brink that is formed at an intersection of the second lateral face and the third lateral face of the master prism structure.

2. The bird-nesting prevention device according to claim 1 wherein the bird's mouth cut attaches the master prism structure to the capital using a bird's mouth joint.

3. The bird-nesting prevention device according to claim 2 wherein the master prism structure forms a barrier that prevents the one or more birds from nesting on the capital of the column.

4. The bird-nesting prevention device according to claim 3
wherein the column further comprises a stanchion;
wherein the stanchion is the extension structure that elevates the capital above a supporting surface;
wherein the stanchion further comprises a superior congruent end;
wherein the superior congruent end is a congruent end of the stanchion;
wherein the superior congruent end forms the superior surface of the stanchion.

5. The bird-nesting prevention device according to claim 4
wherein the capital attaches the porch roof to the superior congruent end of the stanchion;
wherein the capital forms a load path that transfers the load of the porch roof to the stanchion of the column.

6. The bird-nesting prevention device according to claim 5
wherein the capital further comprises a superior capital face and a lateral capital face;
wherein the superior capital face is a horizontally oriented surface that is formed on the superior congruent end of the stanchion by the capital;
wherein the lateral capital face is a vertically oriented surface that is formed on the superior congruent end of the stanchion by the capital.

7. The bird-nesting prevention device according to claim 6
wherein the master prism structure is a prism-shaped structure;
wherein the master prism structure forms the primary shape of the bird-nesting prevention device;
wherein the master prism structure forms the barrier structure that prevents a bird from building a nest on a superior congruent end of the column.

8. The bird-nesting prevention device according to claim 7 wherein the primary shape of the master prism structure forms a triangular prism shape.

9. The bird-nesting prevention device according to claim 8
wherein the first congruent end is a congruent end of the master prism structure;
wherein the second congruent end is the congruent end of the master prism structure that is distal from the first congruent end;
wherein the first congruent end and the second congruent end form the triangular shape of the master prism structure;
wherein the plurality of lateral faces form the lateral faces of the master prism structure;
wherein the plurality of lateral faces form the faces of the master prism structure that run from the first congruent end to the second congruent end;
wherein the plurality of lateral faces form the barrier structure that prevents a bird from building a nest on the superior congruent end of the column.

10. The bird-nesting prevention device according to claim 9
wherein each of the plurality of cants refers to an angle that is formed between any initial lateral face selected from the plurality of lateral faces and any subsequent lateral face selected from the plurality of lateral faces;
wherein the angle formed by each cant selected from the plurality of cants ensures that no horizontal surfaces are presented to a bird at the superior congruent end of the column.

11. The bird-nesting prevention device according to claim 10
wherein the first lateral face is a solid lateral face of the master prism structure;
wherein the first lateral face is bounded by the first congruent end, the second congruent end, the second lateral face, and the third lateral face;
wherein the first lateral face forms a canted surface that is not vertically oriented;
wherein the first lateral face forms a canted surface that is not horizontally oriented;
wherein the position of the canted surface of the first lateral face is such that the first lateral face forms a barrier that makes the superior congruent end of the stanchion unsuitable for a bird's nest;
wherein the second lateral face is a solid lateral face of the master prism structure;
wherein the second lateral face is bounded by the first congruent end, the second congruent end, the third lateral face, and the first lateral face;
wherein the second lateral face is a vertically oriented surface;
wherein the third lateral face is a solid lateral face of the master prism structure;
wherein the third lateral face is bounded by the first congruent end, the second congruent end, the first lateral face, and the second lateral face;
wherein the third lateral face is a horizontally oriented surface.

12. The bird-nesting prevention device according to claim 11
wherein the plurality of cants further comprises a first cant, a second cant, and a third cant;
wherein the first cant is the cant that is formed at the formed by the first lateral face and the second lateral face;
wherein the second cant is the cant that is formed at the formed by the second lateral face and the third lateral face;
wherein the third cant is the cant that is formed at the formed by the third lateral face and the first lateral face.

13. The bird-nesting prevention device according to claim 12
wherein the first cant is an acute angle;
wherein the second cant is a right (90 degree) angle;
wherein the third cant is an acute angle;
wherein the first cant and the third cant are selected such that a bird will be discouraged from nesting on the capital.

14. The bird-nesting prevention device according to claim 13 wherein the superior capital face and the lateral capital face form a brink that is geometrically similar to the brink formed by a seating cut and a heel cut of the bird's mouth cut.

15. The bird-nesting prevention device according to claim 14
wherein the bird's mouth cut is geometrically similar to a brink formed at an intersection of the superior capital face and the lateral capital face of the capital of the column;
wherein the bird's mouth cut is formed such that the bird's mouth cut sits flush against both the superior capital face and the lateral capital face to form a bird's mouth joint that attaches the master prism structure to the capital of the column.

16. The bird-nesting prevention device according to claim 15
wherein the bird's mouth cut further comprises the seating cut and the heel cut;
wherein the seating cut is a solid surface within the master prism structure that is formed by the negative space that creates the bird's mouth cut;
wherein the heel cut is a solid surface within the master prism structure that is formed by the negative space that creates the bird's mouth cut.

17. The bird-nesting prevention device according to claim 16
wherein the surface formed by the seating cut is parallel to the third lateral face of the master prism structure;
wherein the surface formed by the seating cut is perpendicular to the second lateral face of the master prism structure.

18. The bird-nesting prevention device according to claim 17
wherein the surface formed by the heel cut is parallel to the second lateral face of the master prism structure;
wherein the surface formed by the heel cut is perpendicular to the third lateral face of the master prism structure.

19. The bird-nesting prevention device according to claim 18
wherein the seating cut sits flush against the superior capital face of the capital to form the bird's mouth joint that attaches the master prism structure to the capital;
wherein the heel cut sits flush against the lateral capital face of the capital to form the bird's mouth joint that attaches the master prism structure to the capital.

* * * * *